United States Patent [19]

Loncaric

[11] Patent Number: 5,051,047

[45] Date of Patent: Sep. 24, 1991

[54] CLAMPING APPARATUS

[76] Inventor: Karl Loncaric, 3080 Boucherie Road, Kelowna, British Columbia, Canada, V1Z 2G7

[21] Appl. No.: 500,016

[22] Filed: Mar. 27, 1990

[51] Int. Cl.⁵ ............................................. B63B 25/00
[52] U.S. Cl. ..................................... 410/77; 410/110; 24/265 CD; 411/342; 411/21
[58] Field of Search ................. 410/77, 101, 102, 106, 410/107, 108, 109, 110, 112, 116, 80, 84; 24/265 CD, 616, 115 K; 411/21, 340, 341, 342, 345

[56] References Cited

U.S. PATENT DOCUMENTS

| | | | |
|---|---|---|---|
| 2,081,323 | 5/1937 | Cordes | 411/342 |
| 2,897,694 | 8/1959 | Carney | 411/341 X |
| 3,259,353 | 7/1966 | Webb | 410/116 |
| 3,302,508 | 2/1967 | Topf | 411/341 |
| 3,623,690 | 11/1971 | Bargman | 248/361 |
| 3,713,191 | 1/1973 | Hofmann | 24/265 CD X |
| 4,191,108 | 3/1980 | Jones | 24/616 X |
| 4,531,774 | 7/1985 | Whatley | 296/37.6 |
| 4,607,991 | 8/1986 | Porter | 410/110 |
| 4,815,787 | 3/1989 | Hale | 296/167 |

Primary Examiner—Robert J. Spar
Assistant Examiner—Craig Slavin
Attorney, Agent, or Firm—Shlesinger Arkwright & Garvey

[57] ABSTRACT

A clamping apparatus for clamping an object to a member having an opening therein and marginal portions defining, in part, said opening. The apparatus includes a first member engageable with the object and having a first threaded portion. The first threaded portion is in threaded engagement with a second threaded portion complementary to the first threaded portion, the second threaded portion being on a base member having first and second opposite side portions. The apparatus further includes engaging members for engaging the marginal portions adjacent the opening, the engaging members having distal and proximal end portions, the proximal end portions being pivotally connected to the first and second opposite side portions of the base respectively. The distal end portions have respective contact surfaces for engaging the marginal portions about the opening.

21 Claims, 5 Drawing Sheets

CLAMPING APPARATUS

BACKGROUND OF THE INVENTION

The invention relates to a clamping apparatus for clamping an object to a member having an opening therein. The invention has a particular use in clamping accessories, such as a canopy, to a box portion of a pick-up truck.

Pick-up trucks are known to have a box portion for carrying objects such as tools, farm equipment, sand, gravel, hay, etc. The box portion typically has an end portion adjacent the cab of the truck and has two parallel side portions extending towards the rear of the truck. Each of the parallel side portions is typically comprised of thin gauge sheet metal bent to form an inverted U-sectioned rim having a flat upper portion and two closely spaced apart vertical wall portions. Usually, the flat portion has rectangular apertures therein for receiving wooden stakes to increase the height of the side portions as is particularly useful when hauling hay.

Since the advent of the incorporation of rectangular apertures in the truck box side portions, various pick-up truck accessories such as camper tops, canopies, tool boxes, etc. have become available. These accessories are often designed to include mounting holes which align with the rectangular openings in the side portions. Thus, various devices have been designed to cooperate with the rectangular openings to secure accessories to the box of the truck.

U.S. Pat. No. 4,531,774 to Whatley discloses such a device. The device has wedge shaped arms which are hingedly connected to a base member. A bolt is inserted through an aperture in the base member and has an abutment plate secured to its head. The abutment plate abuts both of the wedge shaped arms and tends to spread the arms apart as the bolt is tightened. The wedge shaped arms have outer contact surfaces which are intended to abut closely spaced apart vertical wall portions extending vertically downwards from the rectangular opening in the side portions of the truck box. For the device to work properly, the side portions of the truck must have these vertical wall portions and the vertical wall portions must be rigid enough to resist deformation due to direct sideways forces applied by the contact surfaces of the arms of the device. Not all trucks have vertical wall portions that are sufficiently deep, to cooperate with the arms and which are sufficiently rigid to resist deformation.

U.S Pat. No. 4,607,991 to Porter discloses another clamping device for a truck having closely spaced vertical wall portions. This device has a base member with hinged arms having latching studs affixed to distal ends thereof. The latching studs are intended to be received in holes previously made in the vertical wall portions. The use of this device may present problems in that the holes in the vertical wall portions must be accurately positioned to align with the latching studs. Typically, space is limited in the vicinity of a rectangular opening, rendering the task of making accurately aligned holes difficult.

U.S. Pat. No. 3,623,690 to Bargman discloses another device which relies on the use of vertical wall portions. The device includes two wedge members which are moved relative to each other by turning a bolt. The wedge members move outwards away from each other and abut against the vertical wall portions. Again, with this device the vertical wall portions must be sufficiently rigid to resist deformation.

Accessories for pick-up trucks are becoming increasingly popular and many have a considerable mass and corresponding weight. When such devices are fastened to a truck using the devices disclosed in the patents above, the closely spaced apart vertical wall portions of the truck are placed under considerable load.

Based on the above patents, it appears there is a need for a clamping device which may be used to secure accessories to a pick-up truck without imposing excessive sideways forces on sidewalls of the truck. In addition, there appears to be a need for a clamping device which may be used to secure accessories to a pick-up truck without the need for rigid closely spaced vertical wall portions adjacent the rectangular openings in the side portions of the truck.

SUMMARY OF THE INVENTION

The present invention reduces the problems associated with prior art devices by providing an apparatus insertable into a rectangular opening in the rim of the side portion of the truck, the apparatus including a first member having a first threaded portion and being engageable with an object to be clamped to the truck. The first member is in threaded engagement with a base member having first and second opposite side portions and a second threaded portion complementary to the first threaded portion. The apparatus also has engaging means for engaging marginal portions of the truck's side portions adjacent the opening, the engaging means including first and second engaging members having distal and proximal end portions. The proximal end portions are pivotally connected to the first and second opposite side portions respectively and the distal end portions have respective contact surfaces which engage the marginal portions to clamp the object onto the truck.

The apparatus may further include resilient biasing means for biasing the first and second engaging members such that the distal end portions are spaced apart but may be squeezed together to facilitate insertion of the apparatus into the rectangular opening. The resilient biasing means may include a rectangular spring.

The apparatus may also include limiting means for limiting spreading of the distal end portions of the first and second engaging members. This has been found particularly useful for use in trucks having no sidewalls adjacent the rectangular opening. The limiting means may include a cross-member extending between the distal end portions.

The devices disclosed herein do not impose excessive force on the vertical wall portions in the side walls of the truck but rather, provide a clamping force tending to clamp an accessory onto the truck and therefore reduce the problems associated with the prior art.

DETAILED DESCRIPTION

FIGS. 1, 2, 2a and 2b

Figure 1:
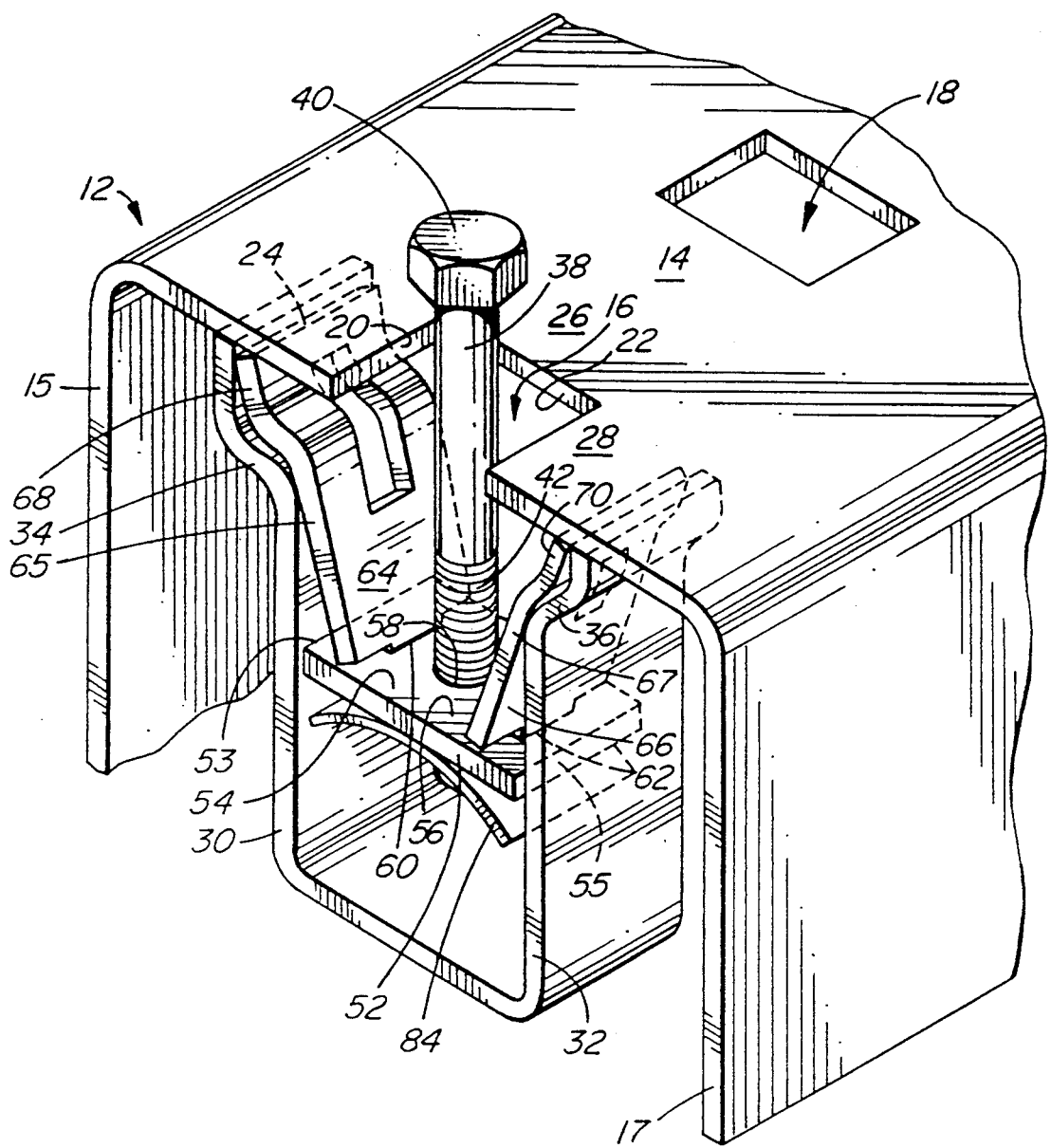
FIG. 1 is a simplified, fragmented perspective view of an apparatus according to a first embodiment of the invention, the apparatus being installed in a truck having closely spaced apart vertical wall portions adjacent rectangular openings in the truck.

Referring to FIG. 1, a clamping apparatus is shown generally at 10 secured to a left rear side portion 12 of a box portion of a pick-up truck. The side portion 12 has an inverted U-sectioned rim having a flat top portion 14 with rectangular openings 16 and 18 therein and two closely spaced apart vertical outer wall portions 15 and 17.

Rectangular opening 16 is defined by four edge portions of the top portion 14, only two of which are shown at 20 and 22 in FIG. 1. Marginal portions of the top portion 14 surround the rectangular opening 16, only three of such marginal portions being shown in FIG. 1 at 24, 26 and 28, a fourth marginal portion being adjacent marginal portions 24 and 28 and being opposite marginal portion 26.

The side portion 12 also has parallel vertical inner wall portions 30 and 32 having bent portions 34 and 36 respectively. The bent portions terminate with, and are fastened to an underside of the flat top portion 14 at the marginal portions 24 and 28.

With the exception of the clamping apparatus 10, all components described above are conventional components of a side portion of a pick-up truck. The description beginning immediately below relates specifically to an apparatus according to a first embodiment of the invention and how the apparatus is used to clamp a canopy to the truck.

Figure 2:
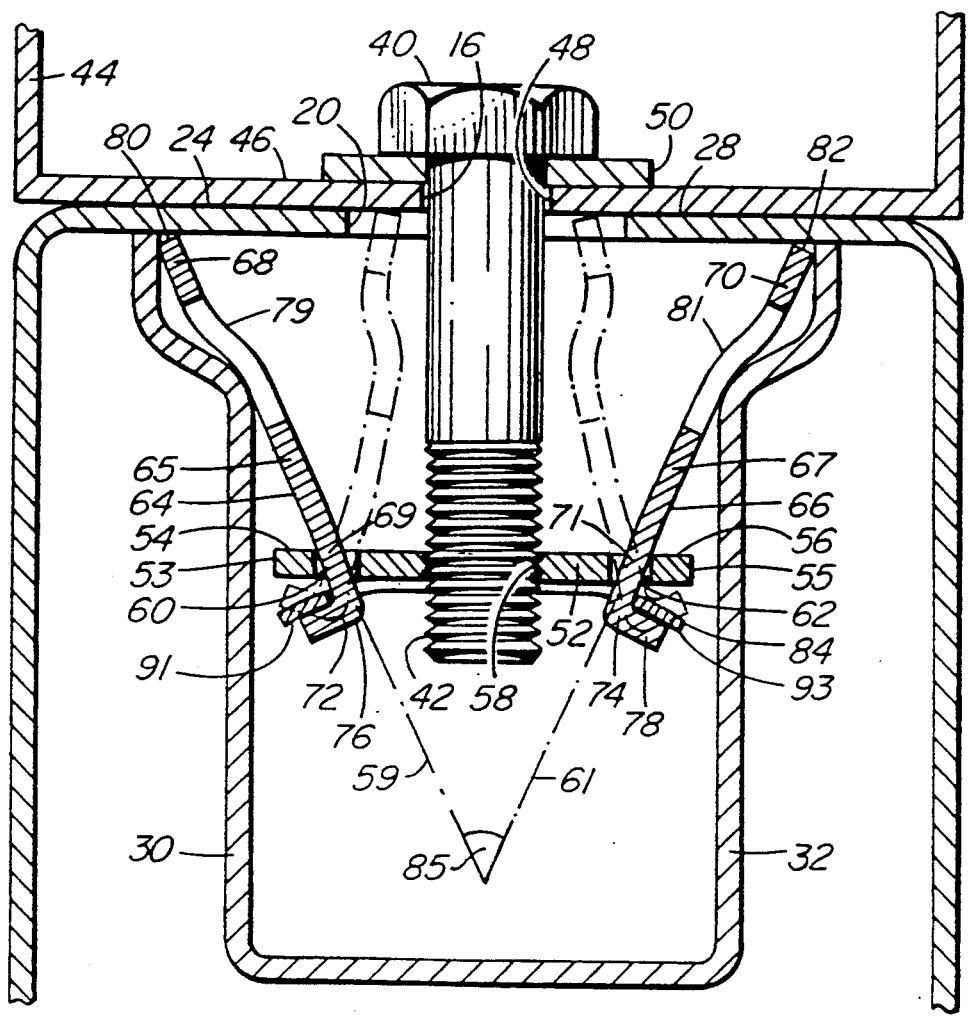
FIG. 2 is a simplified cross-section of the apparatus of FIG. 1.

Referring to FIG. 1, the apparatus 10 comprises a first member 38 which, in this embodiment, is a bolt having a head 40 and a first threaded portion 42. Referring to FIG. 2, the bolt is engageable with an object 44 which, in this case is the canopy. The canopy has a mounting portion 46 having an opening 48 therein for receiving the threaded portion 42 of the bolt therethrough. The head 40 of the bolt may simply abut against the mounting portion surrounding the opening 48 or may abut against a washer 50, the washer itself abutting the mounting portion surrounding the opening. The head of the bolt is thus used to engage the bolt with the canopy.

Referring to FIGS. 1 and 2, the apparatus 10 further comprises a base member 52 having a perimeter, and first and second opposite side portions 54 and 56 with first and second outer edges 53 and 55 respectively. The first and second outer edges are coincident with the perimeter of the base member. The base member also has first and second slots 60 and 62 in the first and second opposite side portions 54 and 56 respectively and a second threaded portion 58 complementary to the first threaded portion 42 disposed centrally between the side portions. In the embodiment shown, the first threaded portion 42 is in engagement with the second threaded portion 58.

The apparatus 10 also comprises engaging means for engaging the marginal portions 24 and 28 adjacent the rectangular opening 16. In the embodiment shown, the engaging means includes first and second engaging members 64 and 66 having respective mid portions 65 and 67 disposed along first and second longitudinal axes 59 and 61 respectively. The first and second engaging members also have respective distal end portions 68 and 70, and respective first and second L-shaped proximal end portions 72 and 74. The proximal end portions are dimensioned to fit loosely within the first and second slots 60 and 62 respectively in the base member 52. The first and second proximal end portions are received within the first and second slots and thus are somewhat pivotally connected to the first and second opposite side portions 54 and 56 respectively. The first and second slots thus act as first and second pivotal connecting means respectively for pivotally connecting the proximal end portions of the first and second engaging members to the first and second opposite side portions respectively.

The distal end portions 68 and 70 have respective outer edges with first and second contact surfaces 80 and 82 respectively thereon. The distal end portions 68 and 70 also have gentle S-shaped bends 79 and 81 respectively which displace the first and second contact surfaces 80 and 82 further outwardly or out of alignment with the mid portions 65 and 67, the contact surfaces being displaced outwardly of the mid portions. The bends 69 and 71, and 79 and 81 ensure, that, in use, the contact surfaces 80 and 82 engage the marginal portions 24 and 28 well away from the rectangular opening 16, where the marginal portions are sufficiently strong to provide resistance to deformation imposed by the clamping apparatus 10.

Figure 2A:
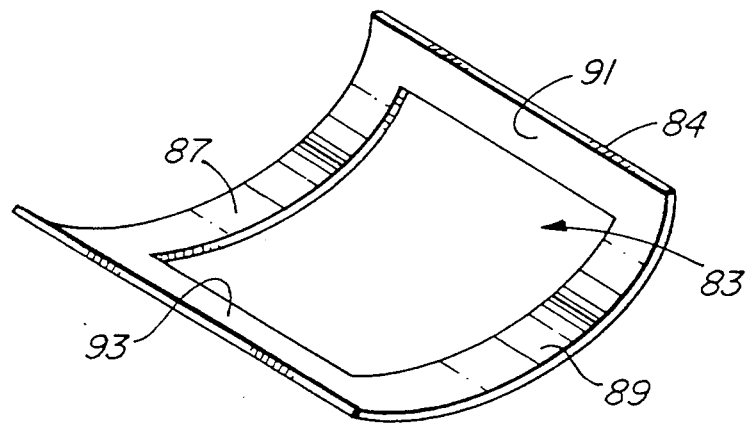
FIG. 2a is a simplified perspective view of a spring member according to the first embodiment, the spring member being illustrated upside down.

Still referring to FIG. 2, the apparatus further includes a spring steel member 84 which in this embodiment is a leaf spring. Referring to FIG. 2a, the spring steel member is illustrated alone, upside down. The member 84 has a generally rectangular shape with a gentle curve longitudinally therein. The member also has a relatively large rectangular opening 83, with side portions 87 and 89 and end portions 91 and 93 adjacent the opening 83.

Figure 2B:
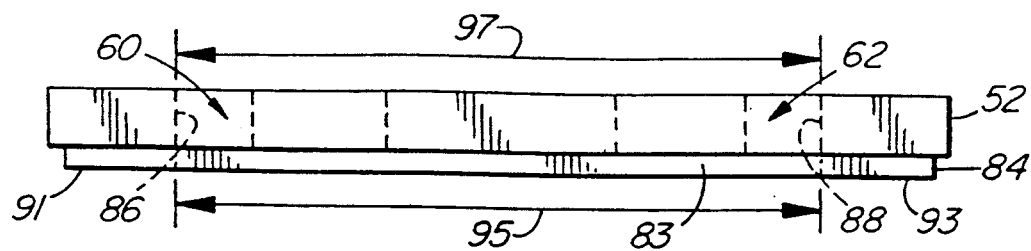
FIG. 2b is a simplified side view of a base member and the spring member of FIG. 2a showing dimensional relationships.

Referring to FIG. 2b, when the spring member is flattened out the opening 83 has a longitudinal dimension 95 equal to a distance 97 between outer faces 86, 88 of the first and second slots 60 and 62 respectively. This ensures that the first and second tabs 76 and 78 are permitted to pivot within the slots 60 and 62.

Figure 3:
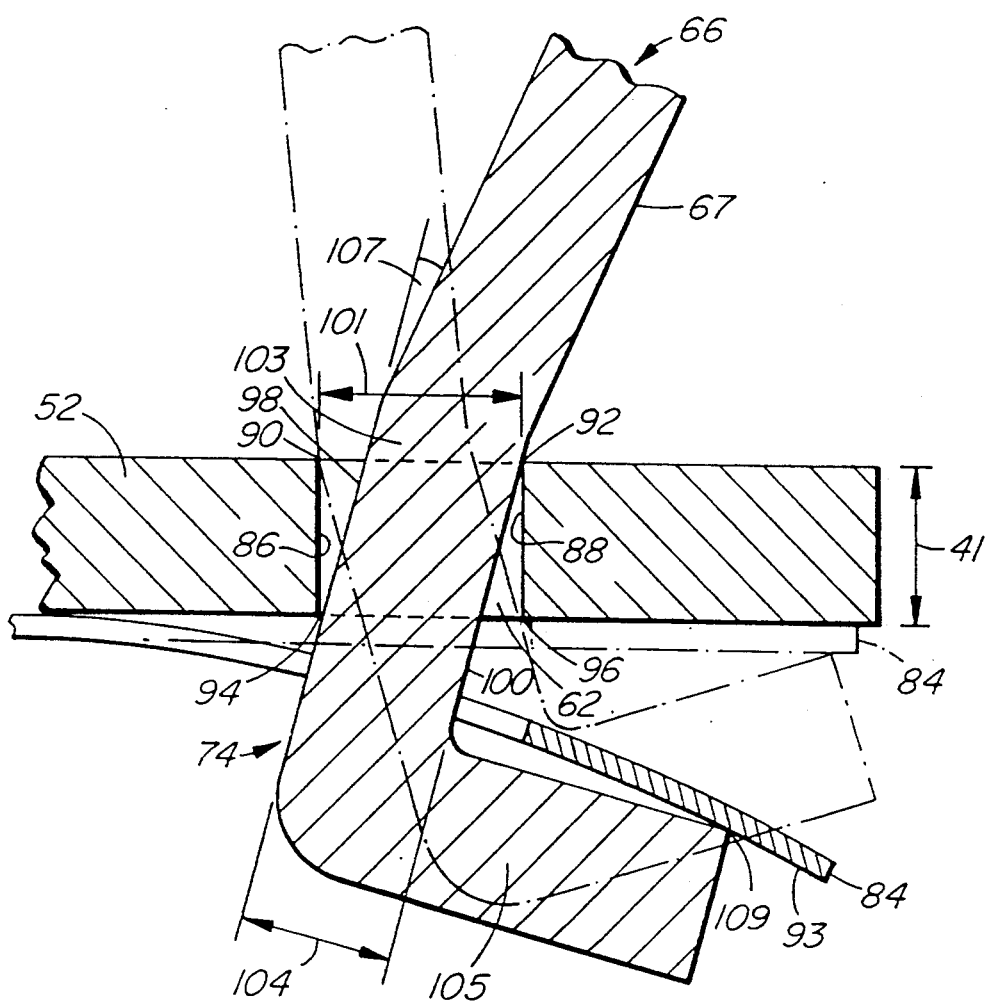
FIG. 3 is a simplified, fragmented, cross-sectional view of the base member of the apparatus and a slot of the base member with a tab therein.

FIGS. 2 and 3

Referring to FIG. 3, components of the second proximal end portion 74 are illustrated, the components of the first proximal end portion being similar. The second proximal end portion 74 has a vertical portion 103 and a horizontal portion 105 which form the L-shape described earlier. Obviously, the terms "vertical" and "horizontal" are merely used to identify specific portions of the proximal end portion and are not necessarily vertical or horizontal at all times, although they are displaced at a constant angle relative to each other at all times. In the embodiment shown, the horizontal portion is at right angles to the vertical portion. The angular spacing between these portions need not necessarily be a right angle, however the inventor has found a right angle to provide satisfactory results.

The vertical portion 103 is angularly displaced from the mid portion 67 by angle 107, the angle being approximately 10°. This serves to further displace the contact surfaces 80 and 82 outwardly to engage the marginal portions 24 and 28 well away from the rectangular opening 16 as shown in FIG. 1.

Referring back to FIG. 3, the horizontal portion 105 has a contact edge 109 which contacts end portion 93 of the spring steel member 84. The curvature of the spring steel member 84 imposes a force on the contact edge 109, tending to bias the engaging members 66 into the position shown in solid outline. It may be seen that the spring steel member 84 acts as resilient means for biasing the first and second engaging members such that the distal end portions are spread apart.

Still referring to FIG. 3, the inner and outer faces 86 and 88 of the second slot 62 have respective top corners 90, 92 and respective bottom corners 94, 96. The slot has a width 101 defined as the distance between the inner and outer faces 86 and 88. The base member 52 has a thickness 41 as shown. The vertical portion 103 has a first surface 98 and a second surface 100. The vertical portion has a thickness 104 defined as the distance between the first and second surfaces 98 and 100 of the vertical portion.

For a given thickness 41 of the base member 52, the difference between the width 101 and the thickness 104 limits the amount of movement of the vertical portion in the slot because the vertical portion can only be moved until the bottom surface 100 abuts the top corner 92 and the top surface 98 abuts the bottom corner 94. This will be referred to as the first position, the first position being shown in full outline. Similarly, the vertical portion may be moved until the bottom surface 100 abuts the bottom corner 96 and the top surface 98 abuts the top corner 90 as shown in broken outline. This will be referred to as the second position, the second position being shown in broken outline.

In the embodiment shown, the thickness of the vertical portion 103 is 3/16th inches, the width of the slot 62 is ¼ inches and the thickness 41 of the base member 52 is 3/16th inches. Consequently, referring to FIG. 2, when the first and second engaging members 64 and 66 are in the first position, the spreading of the distal end portions 68 and 70 is limited such that an angle 85 formed at an intersection of the first and second longitudinal axes 59 and 61 is always less than 90°. Preferably the angle 85 is much less than 90°, and is for example, between 20° and 50°, wherein the first and second engaging members 64 and 66 are disposed generally perpendicular to the base member 52. This ensures that forces imposed by the members on the marginal portions 24 and 28 are generally perpendicular to the marginal portions and place the members under compression when in use. This acts to reduce the susceptibility to bending of the members.

Similarly, the thickness 103, the width 101, and the thickness 41 of the base member 52 given above permit the first and second distal end portions 68 and 70 to be squeezed together into the second position whereupon they are disposed inwardly of the first and second outer edges 53 and 55, within the perimeter of the base member 52. Thus, the slot width, vertical portion thickness, and base member thickness act as limiting means for limiting spreading of the first and second engagement members such that an angle formed at an intersection of the first and second longitudinal axes is always less than 90° and preferably much less than 90°. The inventor has found 30° to be an angle which provides satisfactory results.

OPERATION

The apparatus is initially inserted downwardly through the rectangular opening 16 to perform its clamping function. Consequently, the base member 52 and the first and second engaging members 64 and 66 must be dimensioned to fit through the rectangular opening 16.

Before inserting the apparatus into the rectangular opening 16, the bolt 38 is removed from the base member 52 and is threaded through the opening 48 in the canopy 44, with the washer 50 beneath the head 40. The base member is then threaded back onto the bolt 38 whereupon the apparatus is suspended by the head of the bolt on the canopy.

After the apparatus is suspended as described, the canopy mounting portion 46 may be placed on the flat top portion 14 of the truck. The canopy is placed such that the openings 48 in the canopy are aligned with corresponding rectangular openings 16. The apparatus is then inserted into the opening whereupon the distal end portions are squeezed together, into the second position by edges 20 of the marginal portions 24 and 28 as shown in broken outline in FIG. 2.

As the distal end portions are squeezed together, the proximal end portions 72 and 74 are rotated in their respective slots 60 and 62. The contact edges such as shown at 109 in FIG. 3, press on respective end portions 91 and 93 of the spring steel member 84, tending to oppose the natural tendency of the spring steel member to remain in the curved form. The spring steel member 84 is thus pressed relatively flat against the base member 52 when the engaging members are in the second position as shown in broken outline in FIG. 3. The natural tendency of the spring steel member to assume its curved form causes forces to be exerted on the contact edges (such as 109) of the horizontal portions (such as 105) of the proximal end portions tending to bias the engaging members back into the first position.

Referring to FIG. 2 as soon as the distal end portions are clear of the edges 20, the force provided by the spring steel member 84 causes the distal end portions to spread apart and the apparatus assumes the first position shown in solid outline in FIG. 2. The first and second engaging members 64 and 66 then engage and contact bent portions 34 and 35 respectively of the vertical wall portions 30 and 32.

With the apparatus in place, the bolt 38 can be rotated using a wrench, the resulting rotation causing the base member 58 to be drawn upward, tending to push the first and second engaging members 64 and 66 against the marginal portions 24 and 28. Further rotation of the bolt increases the clamping force of the contact surfaces 80 and 82 against the marginal portions 24 and 28, the increasing clamping force being resisted, in part, by the mounting portion 46 of the canopy. The contact surfaces 80 and 82 act to impose force under the marginal portions 24 and 28 to clamp the object tightly against the marginal portions.

The force imposed by the contact surfaces 80 and 82 has a very large vertical component acting in a direction normal to the underside of the marginal portions and has a horizontal component parallel to the underside of the marginal portions 24 and 28. This horizontal component is small compared to the vertical component and therefore very little force is exerted by the apparatus onto the adjacent vertical sidewalls 30 and 32 of the truck. Clearly, the vertical component provides substantial clamping force to hold the object on the truck. The canopy 44 is thus secured on the truck.

ALTERNATIVES

Figure 4:
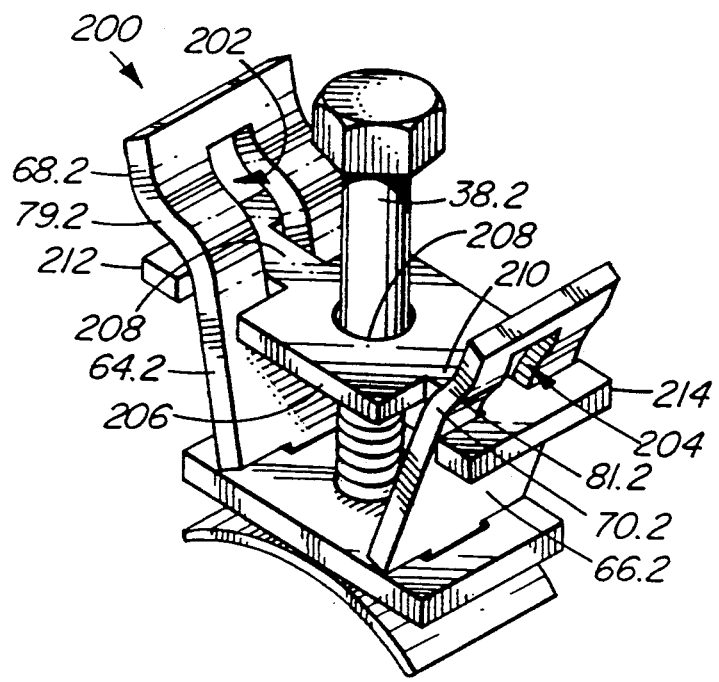
FIG. 4 is a simplified perspective view of an apparatus according to a second embodiment of the invention.
Figure 5:
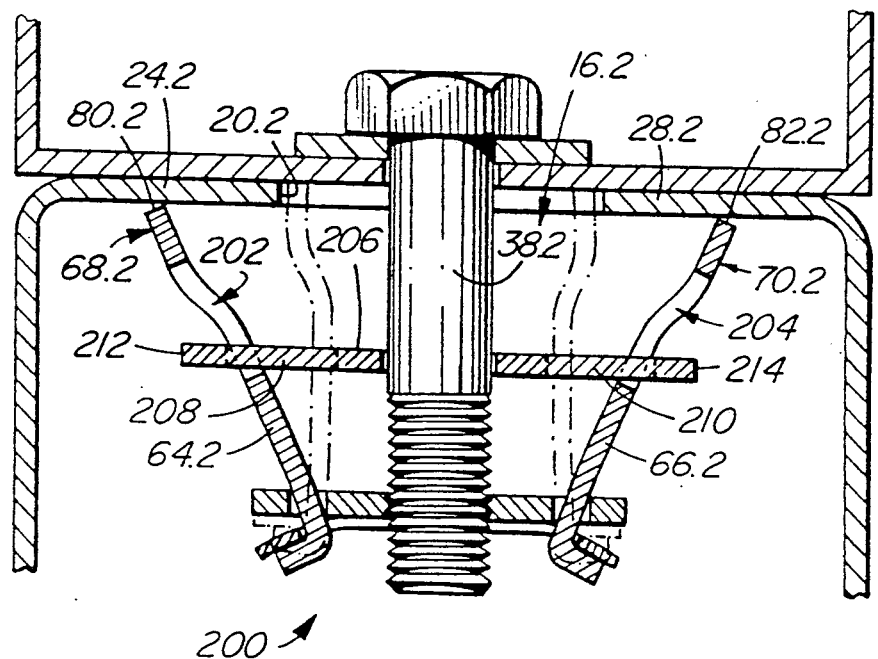
FIG. 5 is a simplified cross-sectional view of the apparatus of FIG. 3 installed on a truck having no vertical wall portions adjacent the rectangular openings.

FIGS. 4 and 5

An apparatus according to a second embodiment of the invention is shown generally at 200 in FIGS. 4 and 5. In the second embodiment, components similar to those already described with reference to the first embodiment are designated by the same numerical references with the addition of "0.2".

Referring to FIGS. 4 and 5, the apparatus 200 is similar to the apparatus 10 with the exception that the first and second engaging members 64.2 and 66.2 have first and second rectangular apertures 202 and 204 respectively therethrough. The apertures are located in the gentle S-shaped bends 79.2 and 81.2 of the distal end portions 68.2 and 70.2.

The apparatus also includes a cross-member 206 which extends between the distal end portions 68.2 and 70.2. The cross-member has a central opening 208 for receiving the bolt 38.2 therethrough. The cross-member also has first and second neck portions 208 and 210 with first and second head portions 212 and 214 respectively thereon.

The first and second head portions 212 and 214 and the first and second openings 202 and 204 in the first and second engaging members are dimensioned such that the head portions 212 and 214 pass through the apertures 202 and 204 when the cross-member is in a first orientation, and do not pass through the apertures in a second orientation, the second orientation being depicted in FIGS. 4 and 5, the first orientation being normal to the second orientation. This permits the cross-member to be easily installed on the apparatus during assembly by placing the cross-member in the first orientation and inserting the head portions 212 and 214 through respective apertures 202 and 204. Once assembled, the cross-member may be rotated into the second orientation. As the head portions cannot pass through the apertures in the second orientation, the head portions interfere with respective first and second engaging members and the spreading of the distal end portions 68.2 and 70.2 is thus limited by the head portions 212 and 214 of the cross-member. The cross-member thus acts as limiting means for limiting spreading of the distal end portions.

The first and second neck portions 208 and 210 and the apertures 202 and 204 are dimensioned such that the first and second engaging members 64.2 and 66.2 may be moved to the second position, shown in broken outline in FIG. 5. In effect, the neck portions 208 and 210 each have a length which enables sufficient movement of the first and second engaging members to allow the distal end portions 68.2 and 70.2 to be squeezed together to clear the edges 20 of marginal portions 24.2 and 28.2 of the opening 16.2 when the apparatus is being inserted into the opening 16.2 of the truck.

Operation of the apparatus 200 is similar to that of the apparatus 10 with the exception that the S-shaped portions of the engaging members do not engage with vertical wall portions of the truck. This apparatus may therefore be used on trucks having no vertical inner side wall portions (30 and 32 in FIGS. 1 and 2) in close proximity to the rectangular opening 16.2.

Installation of the apparatus 200 is similar to that of apparatus 10. After insertion of the apparatus 200 in the opening 16.2, the bolt is rotated to draw the base member upward thereby engaging the contact surfaces 80.2 and 82.2 with the marginal portions 24.2 and 28.2. As the bolt is tightened, the distal end portions 68.2 and 70.2 may have a tendency to spread, however, such spreading is limited by the head portions 212 and 214 interfering with respective engaging members. Further tightening of the bolt results in a clamping force having a strong vertical component acting vertically upward and bearing upon the marginal portions 24.2 and 28.2 as described in connection with the first embodiment. The canopy 44 is thus secured onto the truck.

Further Alternatives

FIGS. 6-8

Figure 6:
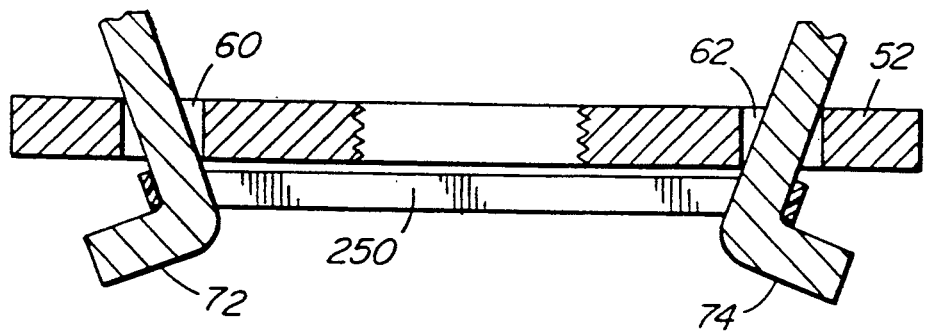
FIG. 6 is a simplified cross-sectional view of an alternative embodiment of the invention in which a rubber band acts as resilient biasing means.

It will be appreciated by one of ordinary skill in the art that the resilient biasing means may be implemented in a variety of different forms. Referring to FIG. 6, the resilient biasing means may include a rubber band 250 wrapped around the vertical portions of the distal end portions of the engaging members.

Figure 7:
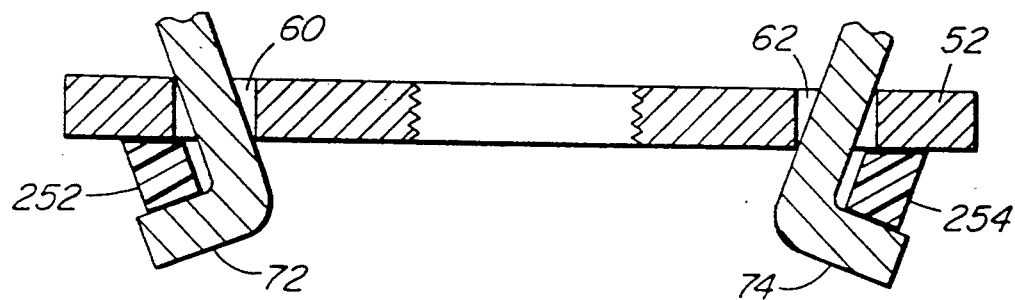
FIG. 7 is a simplified cross-sectional view of an alternative embodiment in which a resilient material is used as resilient biasing means.

Referring to FIG. 7, the resilient biasing means may include first and second resilient blocks of material 252 and 254. The material may be neoprene rubber. Alternatively, the blocks of material may be replaced by compression springs (not shown).

Figure 8:
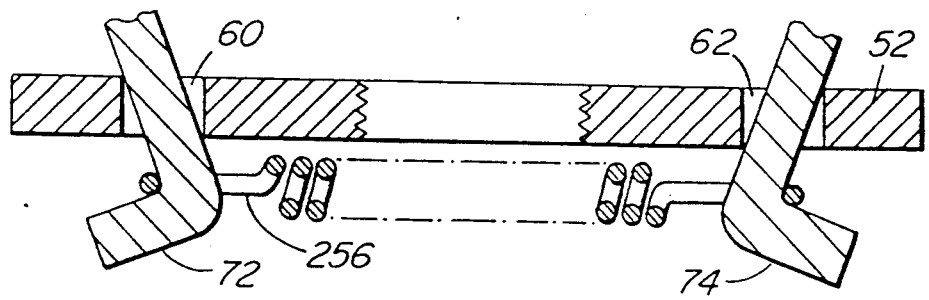
FIG. 8 is a simplified cross-sectional view of an alternative embodiment in which a spring is used as resilient biasing means.

Referring to FIG. 8, the resilient biasing means may include a spring 256 connected between the proximal end portions tending to draw the proximal end portions together.

While specific embodiments of the invention have been illustrated and described, such embodiments should be considered illustrative of the invention only and not as limiting the invention as construed in accordance with the accompanying claims.

What is claimed is:

1. A clamping apparatus for clamping an object to a member having an opening therein and marginal portions defining in part said opening, the apparatus comprising:
   a) a first member having a stop portion and a first threaded portion, said stop portion being engageable with said object;
   b) a base member having first and second opposite side portions and a second threaded portion complementary to said first threaded portion and engageable with said first threaded portion;
   c) first and second engaging members, each member having a distal end portion and a proximal end portion, said proximal end portions being pivotally connected to said first and second opposite side portions respectively, said distal end portions having respective contact surfaces for engaging said marginal portions to clamp said marginal portions between said stop portion and said contact surfaces; and
   d) limiting means for limiting spreading of said first and second engaging members when under load such that an angle formed between said first and second engaging members is always less than 90 degrees and such that said first and second engaging members are under primarily compressive loading.

2. A clamping apparatus as claimed in claim 1 further including resilient biasing means for biasing said first and second engaging members such that said distal end portions are spread apart.

3. A clamping apparatus as claimed in claim 2 wherein said resilient biasing means includes a rubber band connected between said proximal end portions.

4. A clamping apparatus as claimed in claim 2 wherein said resilient biasing means acts on said proximal end portions to draw said proximal end portions together.

5. A clamping apparatus as claimed in claim 4 wherein said biasing means includes a coil spring connected between said proximal end portions.

6. A clamping apparatus as claimed in claim 2 wherein said proximal end portions have respective horizontal and vertical portions forming an L-shape, said horizontal portions being outwardly directed and opposed to each other.

7. A clamping apparatus as claimed in claim 6 wherein said resilient biasing means includes a leaf spring connected between said proximal end portions and disposed between said base member and said horizontal portions.

8. A clamping apparatus as claimed in claim 6 wherein said resilient biasing means includes a resilient material disposed between said horizontal portions and said base member.

9. A clamping apparatus as claimed in claim 1 wherein the limiting means includes first and second slots in first and second opposite side portions of said base member respectively, said proximal end portions being received within said first and second slots respectively, the slots providing a pivotal connection of said first and second engaging members to said base member, said first and second slots each having a slot width, said base member having a base thickness and said proximal end portions having an end portion thickness, said slot width, said base thickness, and said end portion thickness being dimensioned to limit movement of said proximal end portions in said slots.

10. A clamping apparatus as claimed in claim 1 wherein the limiting means includes a cross-member extending between the first and second members.

11. A clamping apparatus as claimed in claim 10 wherein the limiting means includes:
(a) first and second apertures in said first and second distal end portions; and
(b) the cross member having neck portions received within said first and second apertures and first and second head portions adjacent said first and second neck portions, said first and second head portions interfering with said first and second engaging members to limit spreading of said distal end portions.

12. In combination:
a) a member having an opening therein and marginal portions defining, in part, said opening; and
b) a clamping apparatus for clamping an object to said member, the apparatus comprising:
(i) a first member having a stop portion and a first threaded portion, said stop portion being engageable with said object;
(ii) a base member having first and second opposite side portions and a second threaded portion complementary to said first threaded portion and engageable with said first threaded portion; and
(iii) first and second engaging members, each member having a distal end portion and a proximal end portion, said proximal end portions being pivotally connected to said base member, said distal end portions having respective contact surfaces engaging said marginal portions when said first member is tightened in said base member, said object being clamped between said stop portion and said contact portions such that forces imposed by the members on the marginal portions act on said marginal portions at an angle between 45 degrees and 90 degrees relative to the marginal portions and place the first and second engaging members primarily under compression.

13. A combination as claimed in claim 12 wherein the member is a portion of a sidewall of a box portion of a pick-up truck.

14. A clamping apparatus comprising:
a) a first member having a stop portion and a first threaded portion;
b) a base member having first and second opposite side portions and a threaded portion complementary to said first threaded portion and engageable with said first threaded portion;
c) first and second engaging members having first and second longitudinal axes respectively, the engaging members each having a distal end portion and a proximal end portion;
d) first and second pivotal connecting means for pivotally connecting the proximal end portions of the first and second engaging members respectively to the first and second opposite side portions respectively, the first and second pivotal connecting means permitting the engaging members to pivot into a first position wherein the distal end portions of the engaging members are relatively spread apart and permitting the engaging members to pivot into a second position wherein the distal end portions of the engaging members are relatively close together; and
e) limiting means for limiting spreading of the engaging members such that an angle formed at an intersection of the first and second longitudinal axis of the engaging members is always less than 90 degrees and for limiting spreading of the engaging members to maintain said members under primarily compressive forces when in use.

15. A clamping apparatus as claimed in claim 14 further including resilient biasing means for biasing said first and second engaging members such that said distal end portions are spread apart.

16. A clamping apparatus as claimed in claim 14 wherein said proximal end portions have respective horizontal and vertical portions forming an L-shape, said horizontal portions being outwardly directed and opposed to each other.

17. A clamping apparatus as claimed in claim 15 wherein the resilient biasing means includes a spring member connected between said proximal end portions to draw said proximal end portions toward each other thereby spreading said first and second distal end portions apart.

18. A clamping apparatus as claimed in claim 14 wherein the limiting means includes first and second slots in first and second opposite side portions of said base member respectively, said proximal end portions being received within said first and second slots respectively, the slots providing a pivotal connection of said first and second engaging members to said base member, said first and second slots each having a slot width, said base member having a base thickness and said proximal end portions having an end portion thickness, said slot width, said base thickness, and said end portion thickness being dimensioned to limit movement of said proximal end portions in said slots.

19. An apparatus as claimed in claim 15 wherein the limiting means includes:
   a) first and second apertures in said first and second distal end portions; and
   b) a cross-member having neck portions received within said first and second apertures, the cross-member having first and second head portions adjacent said first and second neck portions, said first and second head portions being engageable with said first and second engaging members.

20. An apparatus as claimed in claim 14 wherein said base member has first and second opposite side portions and first and second outer edges adjacent said first and second opposite side portions, said outer edges being coincident with a perimeter of the base member, the first and second pivotal connecting means permitting the engaging members to pivot into the second position wherein the first and second engaging members are disposed inwardly of said first and second outer edges.

21. A clamping apparatus for clamping an object to a member having an opening therein and marginal portions defining in part said opening, the apparatus comprising:
   a) a first member having a first threaded portion, said first member being engageable with said object;
   b) a base member having first and second opposite side portions and a second threaded portion complementary to said first threaded portion and engageable with said first threaded portion;
   c) engaging means for engaging said marginal portions adjacent said opening, the engaging means including first and second engaging members, each member having a distal end portion and a proximal end portion, said proximal end portions having respective horizontal and vertical portions forming an L-shape, said horizontal portions being outwardly directed and opposed to each other, said proximal end portions being pivotally connected to said first and second opposite side portions respectively, said distal end portions having respective contact surfaces for engaging said marginal portions,
   d) resilient biasing means for biasing said first and second engaging members such that said distal end portions are spread apart.

* * * * *